3,405,629
AUTOMATIC DECOMPRESSION SYSTEM
Alan R. Krasberg, Crownsville, Md., assignor to Westinghouse Electric Corporation, Pittsburgh, Pa., a corporation of Pennsylvania
Filed June 22, 1966, Ser. No. 559,432
12 Claims. (Cl. 98—1.5)

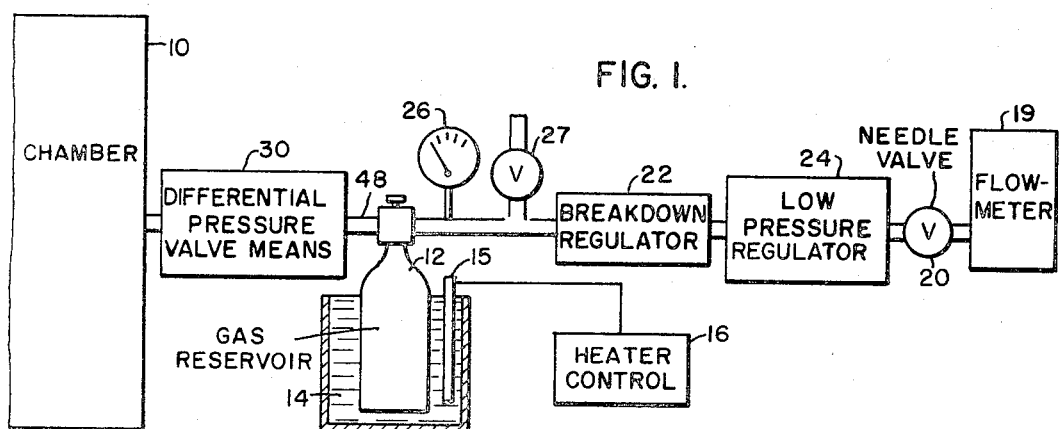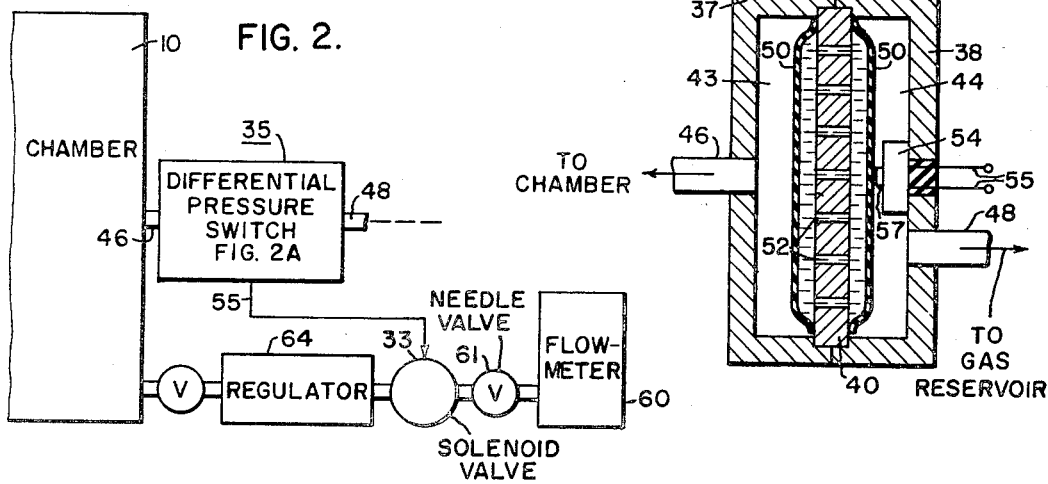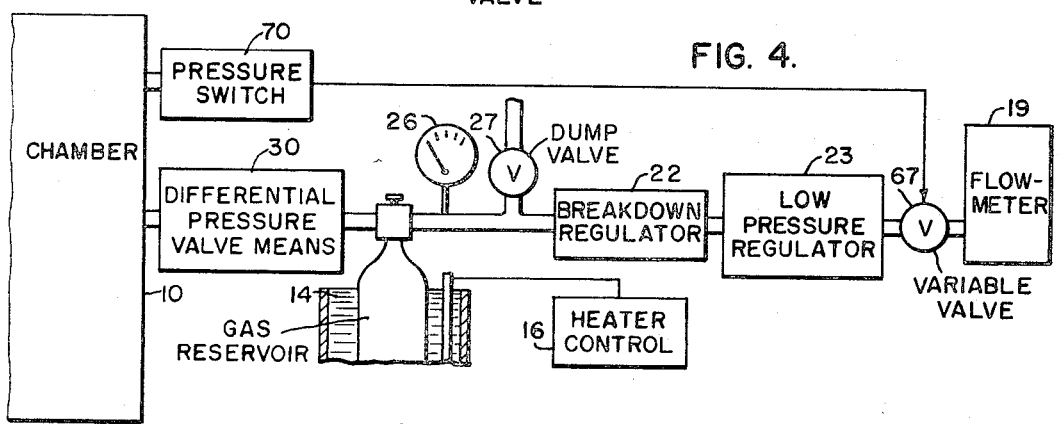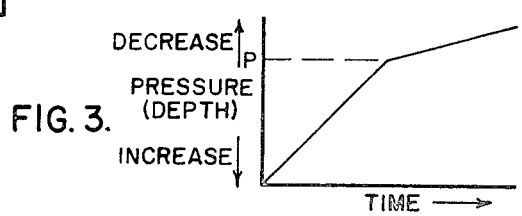

ABSTRACT OF THE DISCLOSURE

A temperature controlled compressed gas reservoir is decompressed in accordance with a desired decompression pattern. A chamber to undergo decompression is coupled to the gas reservoir by means of a differential pressure valve which accordingly relieves the pressure within the chamber at the same rate as the decompression of the gas reservoir.

---

This invention in general relates to decompression chambers, and more particularly to a system for automatically decompressing the chamber.

In diving operations wherein divers operate for prolonged periods of time at elevated pressures, the body absorbs certain gases such as nitrogen. In order to surface without experiencing what is commonly called the "bends," the diver must undergo a time consuming process of decompression in order to purge the absorbed gases from the body. Since, after certain operations, decompression may take place using synthetic atmospheres, and may take a period of hours or even days, the divers may be transferred to a pressure vessel and brought to the surface still under pressure, where they are again transferred to a decompression chamber where decompression procedures can take place in relative comfort.

The chamber is also utilized in emergencies wherein a diver may experience the bends. Generally, the diver is placed within the decompression chamber and "brought down to depth" that is, the pressure in the chamber is increased to a point corresponding to a desired operating depth, after which decompression procedures are initiated.

Usually during a very lengthy decompression it is necessary for two men to carefully control the outflow of gas from the chamber and on a day-to-day decompression schedule, this can be an exacting task. Several parameters such as time, depth or pressure, and oxygen must be carefully watched. When one man decreases the pressure in accordance with the decompression schedule or curve, the other man must add more oxygen to compensate. This however again increases the pressure and the first man must again adjust the pressure. In addition, it is extremely difficult to take into account temperature variations and since a 1% change of temperature is equal to a pressure change of 1% the decompression control can become extremely complicated.

Attempts at automatic straight line decompression have included a flow meter attached to the chamber. With a preset flow, as the pressure within the chamber decreases, so does the output of the flow meter. The addition of oxygen and the temperature changes further complicate things.

It is therefore an object of the present invention to provide an improved automatic decompression system.

Another object is to provide an automatic decompression system which is not adversely affected by temperature variations or oxygen additions to the decompression chamber.

A further object of the invention is to provide an automatic decompression system in which the decompression pattern may be varied.

Another object is to provide an automatic decompression system which provides a safety feature in the event of a malfunction.

Briefly, in accordance with the above objects, the broad concept of the invention comprises a gas reservoir which is decompressed in accordance with a desired decompression pattern. The chamber to be decompressed is coupled with the gas reservoir so that the chamber decompression tracks the gas reservoir decompression. The objects and the basic concept are accomplished in the present invention, one illustrative embodiment of which comprises a differential pressure valve means coupling the chamber with the gas reservoir for relieving the chamber pressure in accordance with the gas pressure of the reservoir.

For a straight line decompression, means are provided to carefully regulate the de-pressurization of the gas reservoir. The means may take the form of a flow meter which is preset to correspond to a certain decreasing pressure versus time rate. In order that the flow meter maintain this constant rate, a series of breakdown regulators may be interposed between the gas reservoir and the flow meter so that the gas enters the flow meter at a substantially reduced constant pressure.

In the event of a malfunction in the decompression system, safety means are provided so that the chamber is not totally decompressed in a dangerously short period of time.

The above stated as well as further objects and advantages of the present invention will become apparent upon a reading of the following detailed specification taken in conjunction with the drawings in which:

FIGURE 1 schematically illustrates one embodiment of the present invention;

FIG. 2 illustrates one type of differential pressure valve means which may be used in the system of FIGURE 1;

FIG. 2A illustrates, in more detail, a cross-sectional view of one type of differential pressure switch which may be used in the present system;

FIG. 3 illustrates one type of decompression pattern or curve; and

FIG. 4 illustrates an embodiment of the present invention wherein the decompression pattern may be varied.

Referring now to FIGURE 1 there is shown a system for automatically decompressing chamber 10. The system includes a source of gas under pressure illustrated by the gas reservoir tank 12 with the gas being maintained at a desired constant temperature by means of for example a water bath 14 which in turn is maintained at a desired temperature by the heater 15 and heater control 16. Various gases may be used in the present system, one economical example being compressed air.

Means are provided in order to decompress the gas reservoir 12 in accordance with a desired decompression pattern. By way of example, the pattern may be a straight line decompression corresponding to a equivalent ascent by a diver of a few inches per minute. A flow meter 19 is provided for regulating the outflow of gas and is set by needle valve 20 to a desired flow rate. If the gas reservoir 12 were connected directly to the flow meter 19, as the pressure within the gas reservoir decreased during decompression, the flow meter output would correspondingly decrease and a feedback system could be added to maintain the flow meter at the desired constant rate. Alternatively, and as illustrated in FIGURE 1, a series of regulators may be interposed between the gas reservoir and the flow meter and may include for example a breakdown regulator 22 which drops the high pressure from the gas reservoir 12 to a low pressure for example in the order of 2 to 3 p.s.i. (pounds per square inch). The low pressure regulator 24 is connected to a nearly constant input pressure, the 2 to 3 p.s.i. from the breakdown regulator 22, and provides an output pressure which is constant so that the flow meter may be set to the desired rate and without subsequent compensation. Other means may be provided to regulate the decompression of the gas reservoir 12. By way of example, the system could utilize one or more calibrated orifices which, given a constant gas density and constant pressure, results in a constant flow.

A pressure gauge 26 is provided to give a visual indication of the pressure within the gas reservoir, which pressure may be brought down to a desired point by means of a dump valve 27.

In operation, knowing the volume of gas in the cylinder 12, plus any residual gas in the pipes etc., the flow meter can be adjusted to a certain value to correlate with a recompression measurable in inches per minute.

Means are provided for coupling the chamber with the gas reservoir 12 so that as the gas reservoir 12 decompresses according to a certain pattern the chamber 10 will follow accordingly. A differential pressure valve means 30 is provided in order to couple the chamber for tracking the decompression of the reservoir 12. Basically, the differential pressure valve means 30 senses the pressure within the chamber 10 in addition to the pressure of the gas reservoir 12 and if the chamber pressure is higher, the differential pressure valve means 30 will operate to decrease the chamber pressure to a point equal with the gas reservoir pressure. One method of accomplishing this action is by a diaphragm-piston arrangement wherein a differential pressure causes movement of the diaphragm which in turn moves the piston to open up an exhaust port for decreasing the chamber pressure. As the pressure is equalized the diaphragm moves back to a rest position wherein the piston member prevents exhausting. Another method by which the chamber may be made to track the gas reservoir 12 is illustrated in more detail in FIGURE 2.

In FIG. 2 chamber pressure is relieved by means of the solenoid valve 33 under control of the differential pressure switch 35. One type of differential pressure switch which may be utilized in the present invention, is illustrated in a more detailed cross-sectional view in FIGURE 2A. The switch 35 includes first and second casing members 37 and 38 which together with a central plate member 40 define two cavities 43 and 44 with the cavity 43 being coupled to the chamber 10 by conduit 46, and the cavity 44 being coupled to the gas reservoir by conduit 48. Covering each side of plate 40 is a membrane 50 which encloses a fluid adapted to flow through the plate 40 by means of a plurality of apertures 52. When the pressure within cavity 44 is greater than the pressure within cavity 43, the membrane 50 is distended into the cavity 43 and lies substantially flat against the plate member 40 in cavity 44. Conversely when the pressure in cavity 43 is greater than the pressure in cavity 44 the membrane 50 is distended into the cavity 44. A microswitch 54 is provided and is operative to provide a signal on leads 55 when actuated. The actuation of the microswitch 54 is accomplished by the membrane 50 pressing against microswitch plunger 57 with the increase of pressure in cavity 43 over that of cavity 44, and accordingly an increase of pressure in the chamber 10 over the pressure of the gas reservoir 12. Differential pressure switches such as shown in FIG. 2A are commercially available and per se form no part of the present invention. FIG. 2A is merely indicative of one type of differential pressure sensing means that may be utilized.

Referring back to FIGURE 2, the switch 35 in conjunction with the solenoid valve 33 functions to relieve the pressure within the chamber 10 when it is greater than the pressure of the gas reservoir 12. As an added safety feature, should the solenoid valve 33 remain in an open position due to a malfunction of for example the microswitch 54 or the solenoid valve itself, there is provided a flow meter 60 preset by means of needle valve 61 and through which the solenoid valve 33 discharges so that with the solenoid valve constantly open the chamber will experience only a slight decreasing pressure rate rather than a dangerously large pressure decrease rate and in this manner the situation is given time to be corrected while not endangering the lives of the personnel within the chamber. A regulator means 64 is provided in the safety arrangement for reducing the high pressure within the chamber to a lower pressure in a manner similar to that described with respect to FIGURE 1.

In some situations it may be desirable to go through a decompression procedure other than a straight line decompression. One such decompression pattern is illustrated in the curve of FIGURE 3 wherein the abscissa represents time, and the ordinate represents pressure or depth. The decompression pattern illustrated in FIGURE 3 is closely allied to a straight line decompression however the curve illustrates that at some pressure P it is desired to change the rate of ascent, that is the rate of decrease of pressure. FIGURE 4 illustrates an embodiment of the invention for use where a variable ascent pattern is utilized.

In FIGURE 4, components similar to those described with respect to FIGURE 1 have been given the same reference numeral. The system of FIGURE 4 includes a variable valve 67 for controlling the flow meter rate. Means are provided to sense the pressure within the chamber 10 so that when a desired pressure is reached, the valve 67 may be changed to provide a different flow rate as at point P of FIGURE 3. One method of accomplishing this is by the provision of a pressure switch 70 which may be preset to the desired pressure P and when the pressure within the chamber 10 attains that value P the pressure switch will provide a signal to move the variable valve 67 to a second preset position. The concept illustrated in FIGURE 4 can be extended to accommodate a wide variety of rate changes by selecting predetermined pressure points for causing preset changes of the variable valve 67. Alternatively a plurality of pressure switches with a plurality of flow meters each with an associated valve may be provided.

Accordingly, there has been provided an automatic decompression system wherein a chamber under decompression decompresses in accordance with the precontrolled decompression of a standard. Any temperature variations in the chamber tending to increase the pressure, or an increase in pressure due to the addition of oxygen (from a source not shown) is compensated for by the differential pressure valve means which causes an equalization of the chamber and gas reservoir pressures. The system finds great utility in diving operations but its use is not limited thereto. For example the chamber finds use in medical studies, physiological studies of humans or animals under pressure, and medical hyperbaric chambers wherein operations are performed at elevated pressures.

Although the present invention has been described with a certain degree of particularity, it should be understood that the present disclosure has been made by way of example, and that modifications and variations of the present invention are made possible in the light of the above teachings.

What is claimed is:
1. An automatic decompressor for a chamber, comprising:
   (A) a gas reservoir including a compressed gas at a pressure higher than ambient atmospheric pressure;
   (B) first means for decompressing said gas reservoir independently of any ambient atmospheric pressure variations and in accordance with at least a first rate corresponding to a first rate of ascent of a desired decompression pattern; and
   (C) means coupling said chamber with said reservoir for relieving the pressure within said chamber at substantially said first rate in accordance with said decompression of said gas reservoir.

2. An automatic decompressor according to claim 1, which includes means for maintaining the gas reservoir at a constant temperature.

3. An automatic decompressor according to claim 1, wherein the means for decompressing the gas reservoir includes a breakdown regulator means whereby the elevated pressure of the gas reservoir is reduced to a relatively constant pressure.

4. An automatic decompressor according to claim 3, which includes a flow meter coupled to the breakdown regulator means for establishing a desired decompression rate.

5. An automatic decompressor according to claim 1 wherein the means coupling the chamber with the gas reservoir includes a valve connected with the chamber and operable in response to the difference in pressures between the chamber and the gas reservoir.

6. An automatic decompressor according to claim 5, wherein the difference in pressures is sensed by a differential pressure switch which provides a signal to open the valve.

7. An automatic decompressor according to claim 1 which includes means for changing the decompression pattern to include at least a second rate of ascent.

8. An automatic decompressor according to claim 7 wherein the means for changing the decompression pattern includes at least one pressure sensitive switch preset to a certain pressure for changing the decompression to the second rate when the set pressure is reached.

9. An automatic decompressor according to claim 1 wherein the means coupling the chamber with the reservoir includes a valve member and means for controlling the flow of gas through the valve member to a preset rate.

10. An automatic decompressor according to claim 1 wherein the gas reservoir comprises a tank of compressed air.

11. A method of automatically decompressing a chamber comprising the steps of:
  (A) decompressing a compressed gas reservoir at a desired rate independently of any ambient atmospheric pressure variations; and
  (B) coupling the chamber to the gas reservoir in a manner that the relieving of the pressure within the chamber is at substantially the same rate as the decompression of the gas reservoir.

12. An automatic decompression system comprising:
  (A) a chamber;
  (B) a gas reservoir including a compressed gas;
  (C) first means for reducing the pressure of said gas from a first to a second value over a predetermined period of time; and including
    (1) a calibrated flow device for discharge of said gas to ambient atmosphere
    (2) means for adjustably varying the rate of said discharge independently of any ambient atmospheric pressure variations; and
  (D) means coupling said chamber with said gas reservoir for reducing the pressure within said chamber by an amount substantially equal to the difference between said first and second values over said predetermined period of time.

References Cited
UNITED STATES PATENTS

| | | | |
|---|---|---|---|
| Re. 24,900 | 11/1960 | Klemperer | 98—1.5 |
| 2,396,116 | 3/1946 | Noxon | 98—1.5 |
| 2,407,257 | 9/1946 | Del Mar | 98—1.5 |
| 2,450,076 | 9/1948 | Bechberger | 98—1.5 |
| 2,513,332 | 7/1950 | Kemper | 98—1.5 |

MEYER PERLIN, *Primary Examiner.*